March 10, 1964   R. MacINTYRE   3,123,864
MOLDING APPARATUS
Filed June 5, 1961
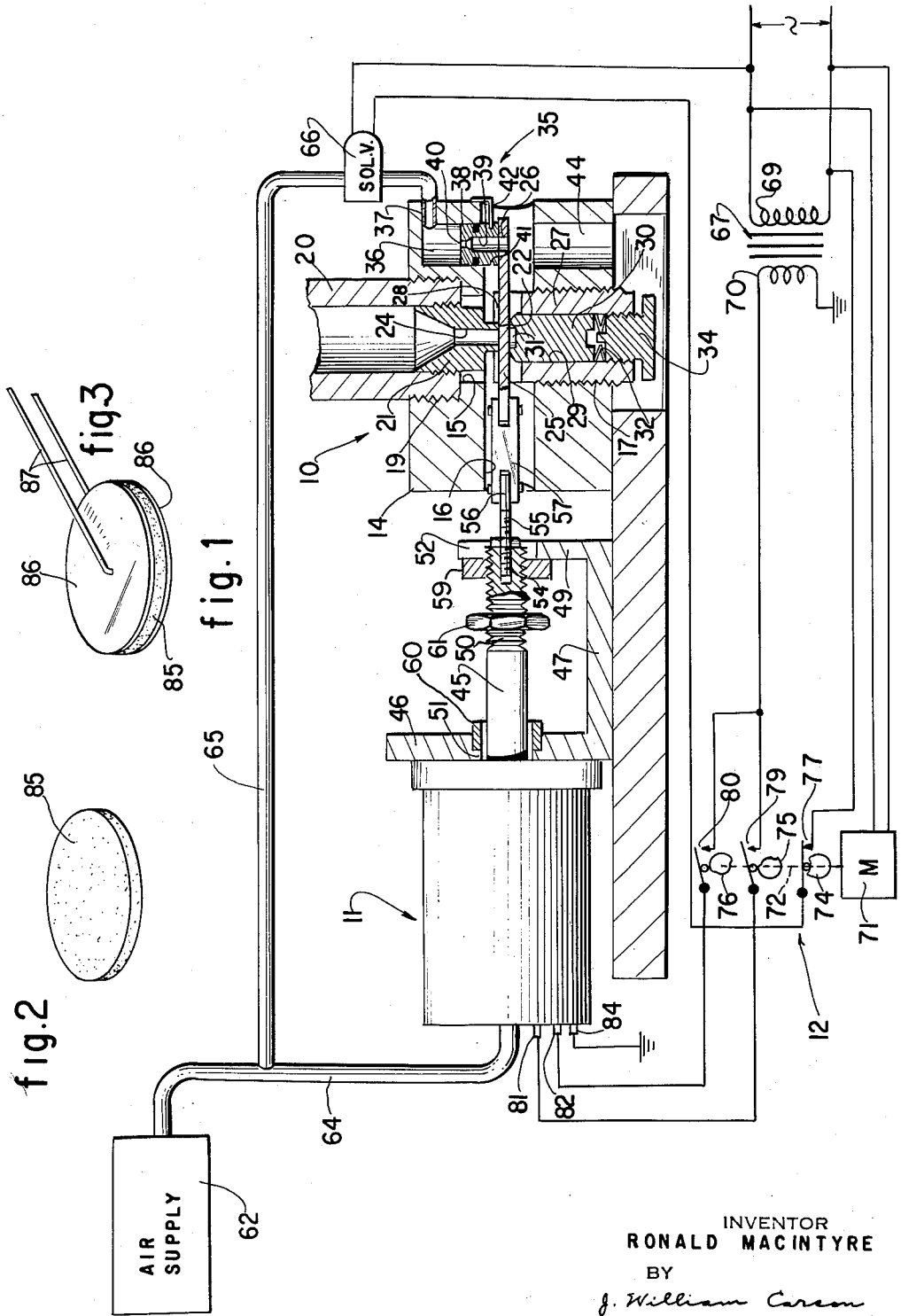
INVENTOR
RONALD MACINTYRE
BY
J. William Carson
ATTORNEY 3,123,864
MOLDING APPARATUS
Ronald MacIntyre, North Arlington, N.J., assignor to Specialties Development Corporation, Belleville, N.J., a corporation of New Jersey
Filed June 5, 1961, Ser. No. 115,009
4 Claims. (Cl. 18—30)

This invention relates to molding apparatus, and, more particularly, to apparatus for molding bodies for electrical resistance units from an extrudable material.

Such units are composed of a body of electrically resistive material having thermistor, varistor and/or resistor characteristics and a pair of spaced terminal wires affixed to the body. The electrical properties of such units are dependent upon the material used, the dimensions of the body of resistive material, and the spacing of the terminal wires.

In order to produce units having uniform electrical characteristics, it is necessary that the dimensions of the body and the spacing of the terminals be maintained constant.

Accordingly, it is an object of the present invention to provide apparatus for producing such bodies of uniform dimensions.

Another object is to produce such bodies having a pair of uniformly spaced surfaces for the placement of terminals.

Another object is to provide molding apparatus which operates automatically.

A further object is to provide such apparatus for rapidly producing uniform bodies at low cost.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing apparatus for molding electrically resistive bodies of an extrudable material comprising in combination an extruding die having a face provided with an outlet opening; means for extruding the material through the die; a mold member having first and second surfaces and provided with a mold cavity extending therethrough from the first surface to the second surface, the mold member having the first surface in sliding contact with the die face and being movable between a first position wherein the cavity is in alignment with the opening to allow material to fill the cavity and a second position wherein the cavity is spaced from the opening; and means for removing the material from the cavity when the mold member is in the second position.

A preferred embodiment of the invention has been chosen for purposes of illustration and description, and is shown in the accompanying drawing, forming a part of the specification, wherein:

FIG. 1 is a side view of molding apparatus according to the present invention, partly in elevation and partly in section, and a wiring diagram including the elements for controlling the operation of the apparatus.

FIG. 2 is a perspective view of a body formed by the apparatus shown in FIG. 1.

FIG. 3 is a perspective view of a completed unit.

Referring to FIG. 1 of the drawing in detail, there is shown molding apparatus according to the present invention which generally comprises an extrusion molding device 10, a reciprocating air motor 11 for driving the device 10, and an electrical control wiring diagram including a timing mechanism 12.

The extrusion molding device 10 includes a cylindrical body 14 having a centrally positioned vertical bore 15 and an intersecting horizontal bore 16. The vertical bore 15 is formed with a threaded portion 17 below the bore 16 and an enlarged threaded portion 19 extending downwardly from the upper surface of the body 14. A tube 20 for feeding the resistive material into the device 10 is threaded into the portion 19 of the bore 15. An extrusion die 21 having a face 22 and provided with a tapered passageway 24 intersecting the face 22, is threaded into the tube 20 and extends into the horizontal bore 16.

A bar shaped member 25 is positioned to reciprocate within the bore 16 with its upper surface in contact with the face 22 of the die 21. The member 25 is provided with a vertically aligned cylindrical cavity or bore 26 extending therethrough adjacent the right end thereof which serves as a mold in the manner described hereinafter.

A guide plug 27 threaded into the bore portion 17 extends upwardly into the bore 16 and is provided with a slot 28 at the upper end thereof aligned with the bore 16 to receive and guide the mold member 25. The guide plug 27 is also provided with a central bore 29, and a supporting member 30 having a cylindrical recess or cavity 31 in the upper end thereof is slidably positioned in the bore 29 to engage the lower surface of the mold member 25. A spring washer 32 is positioned below the member 30 and an adjusting plug 34 is threaded into the lower end of the bore 29 to act against the washer 32 and urge the member 30 upwardly against the mold member 25.

An ejector mechanism 35 is provided at the right end of the bore 16 to remove the molded material from the cavity 26. The mechanism 35 includes a piston chamber 36 extending upwardly from the bore 15 and being provided with an inlet port 37. A piston 38 having a central passageway 39 provided with a small diameter orifice 40 at the upper end thereof is positioned in the chamber 36. An annular groove 41 is formed about the lower end of the piston 38, and an L shaped spring member 42 is secured to the body 14 and engages the groove 41 to urge the piston 38 upwardly into the chamber 36. A bore 44, extending downwardly from the bore 16 and in alignment with the chamber 36, is provided to carry away the articles ejected from the mold cavity 26.

The air motor 11 is a solenoid controlled, air operated, reciprocating piston motor, which, when connected to a supply of pressurized air, will extend its piston shaft 45 when one of its electrical terminals is energized and will retract its piston shaft 45 when the other of its terminals is energized. A motor suitable for this purpose is a model BFFEM-2-20 air motor, manufactured by The Bellows Company, Division of IBEC, Akron, Ohio, equipped with an electrical air control valve.

The motor 11 is mounted on a vertical leg 46 of a U-shaped bracket or channel member 47 having a second vertical leg 49. The piston shaft 45 has an externally threaded end section 50 and extends through an opening 51 in the bracket leg 46 and through a slot 52 in the bracket leg 49 toward the molding device 10. A threaded bore 54 is provided in the end of the shaft 45, and a rod 55 having a flat plate-like head section 56 is threaded into the bore 54. The head section 56 of the rod 55 and the mold member 25 are pinned to opposite ends of a link 57 to translate the motion of the shaft 45 to the mold member 25. A nut 59 is mounted on the threaded shaft section 50 and is adjusted to engage the bracket leg 49 when the cavity 26 is aligned with the piston passageway 39. A cylindrical stop member 60 is secured to the bracket leg 46 about the opening 51, and a second nut 61 positioned on the shaft portion 50 is adjusted to engage the stop 60 when the cavity 26 is aligned with the passageway 24 in the die 21.

Compressed air to operate the air motor 11 and ejector mechanism 35 is supplied from a source 62, which may be an air compressor system. The source 62 is connected to the air motor 11 through a conduit 64 and to the inlet port 37 of the ejector mechanism through a branch conduit 65. A solenoid valve 66 is provided in the branch conduit 65 to control the flow of pressurized air to the piston chamber 36.

The electrical control circuitry includes a stepdown transformer 67 having a primary winding 69 connected to an 110 volt alternating current line and a secondary winding 70 for delivering 8 volt alternating current power. The timing mechanism 12 includes a motor 71 having a shaft 72, three cams 74, 75, 76 mounted on the shaft 72, and three switches 77, 79, 80 operated by the cams.

The motor 71 is connected across the winding 69 to receive power from the line, and the switch 72 is connected in series with the solenoid valve 66 across the winding 69. One side of the winding 70 is grounded, and the switches 79 and 80 are connected between the other side of the winding 70 and air motor terminals 81 and 82 respectively. The terminal 81 is connected to the winding of a solenoid (not shown) within the air motor which operates valving to cause the piston shaft 45 to be extended, and the terminal 82 is connected to the winding of another solenoid (within the air motor) which operates valving to cause the piston shaft 45 to be retracted. The solenoid circuits are completed through a terminal 84 which is connected to ground.

In operation, a resistive material in a plastic state such as disclosed in United States Patent 2,495,867, is placed in the tube 20 to be extruded through the passageway 24 by a hydraulic press not shown. The motor 71 rotates the shaft 72 and the cams 77, 79, 80 in a clockwise direction to produce the following sequence of events.

As the cams rotate past the position shown in FIG. 1, the switch 80 closes (switches 79 and 77 then being open) to energize the terminal 82 and the air motor retracts the piston shaft 45 until the mold member 25 is in the position wherein the bore 26 is aligned with the passageway 24. The material then is extruded into the bore 26 and the cavity 31. The mold member 25 remains in this position until the cams rotate to a position wherein the switch 80 opens and the switch 79 closes (the switch 77 being still open at this point). The terminal 81 is then energized and the air motor drives the shaft 45 and the mold member 25 toward the right.

As the mold member moves to the right the disc of resistive material within the bore 26 is sheared from the material in the passageway 24 and the cavity 31. Since the disc within the mold bore 26 is sheared from a column of identical material extending from the passageway 24 to the cavity 31, both surfaces of the disc have the same texture. Such a column is provided by dimensioning the die opening of the lower end of the passageway 24 and the cavity 31 to have an area to place the respective ends of the bore 26 in complete registry with the die opening and the cavity, as shown in the drawing, so that the entire opposite surfaces of the element formed in the mold bore are sheared from the column of material.

The shaft 45 continues to move until the mold member 25 is in a position whereby the bore 26 is in line with the passageway 39 of the piston 38. During this operation the solenoid valve 66 is closed and the piston 38 is held in an elevated position by the spring 42. When the cams assume the position shown in FIG. 1, the switch 77 closes energizing the solenoid 66 to admit pressurized air into the piston chamber 36. The piston is then moved downwardly against the mold member 25 and pressurized air flows through the passageway 39 and blows the disc of resistive material out of the bore 26 allowing it to drop through the bore 44 for subsequent collection. This operation is automatically repeated during each revolution of the motor 71.

The material deposited in the cavity 31 remains therein and provides a surface of a texture identical to that at the upper end of the bore for succeeding shearing operations, whereby all the discs have the same texture at both sides thereof.

Preferably, at the end of each period of operation such as the end of the day or each shift, the machine is cleaned and the slug of material in the cavity is removed so that it can be replaced with a fresh slug when the apparatus is operated again.

In FIG. 2 there is shown a disc 85 of resistive material as produced by the present invention. This disc is fused by firing; and, as shown in FIG. 3, a coating 86 of conductive material such as silver is applied to the flat surfaces of the disc, and terminal wires 87 are attached to the coatings 86 to complete the unit.

From the foregoing description, it will be seen that the present invention provides apparatus for automatically rapidly producing uniform resistive bodies and at low cost.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Apparatus for molding articles of an extrudable material comprising in combination an extruding die having a face provided with an outlet opening, a support member beneath and spaced from said face, a mold member having first and second surfaces and being provided with a mold bore extending therethrough from said first surface to said second surface, said mold member having said first surface in sliding contact with said die face and said second surface in sliding contact with said support member, said mold member being movable between a first position wherein said bore is between said die face and said support member and is in alignment with said die opening to allow material to fill said bore and a second position wherein said bore is disposed outwardly of said die face and said support member, a source of air under pressure, and means for removing said material from said bore when said mold member is in said second position including a reciprocating piston adjacent said mold member having an end face provided with an air passageway therethrough and being operated in one direction by air under pressure from said source and including means for slidably mounting said piston to move said end face into contact with said one of surfaces of said mold member and said passageway in registry with said bore when said piston is pressurized whereby air flows through said passageway to eject said material from said bore and including a return spring for said piston for operating the same in the other direction.

2. Apparatus according to claim 1, including means for moving said mold member between said first and second positions, and means for sequentially operating said removing means and said mold member moving means.

3. Apparatus for molding articles of an extrudable material comprising in combination an extruding die having a face provided with an outlet opening, a fixed support member beneath and spaced from said face, a mold member having first and second surfaces and being provided with a mold bore extending therethrough from said first surface to said second surface for forming an element from the material, said mold member having said first surface in sliding contact with said die face and said second surface in sliding contact with said support member, said mold member being movable between a first position wherein said bore is between said die face and said support member and is in registry with said die opening to allow material to fill said bore and a second position wherein said bore is disposed outwardly of said die face and said support member, said support member having an upwardly facing mold cavity therein beneath and in alignment with said die opening of an area for placing said bore in complete registry therewith and to receive and retain material passing through said bore when said bore is in its first position, and means for removing the element from said bore when said mold member is in said second position.

4. Apparatus according to claim 3, including a guide member for slidably guiding said mold member during movement between said positions, and means for adjustably positioning said support member within said guide member.

References Cited in the file of this patent

UNITED STATES PATENTS

| | | |
|---|---|---|
| 1,455,240 | Cobb | May 15, 1923 |
| 2,258,288 | Heft et al. | Oct. 7, 1941 |
| 2,471,703 | Rapp et al. | May 31, 1949 |
| 2,939,407 | Keathley et al. | June 7, 1960 |

FOREIGN PATENTS

| | | |
|---|---|---|
| 426,974 | Great Britain | Apr. 12, 1935 |
| 459,097 | Great Britain | Jan. 1, 1937 |